Nov. 13, 1951     P. B. KING, JR     2,574,790
WAVE GUIDE
Filed May 24, 1946     3 Sheets-Sheet 1
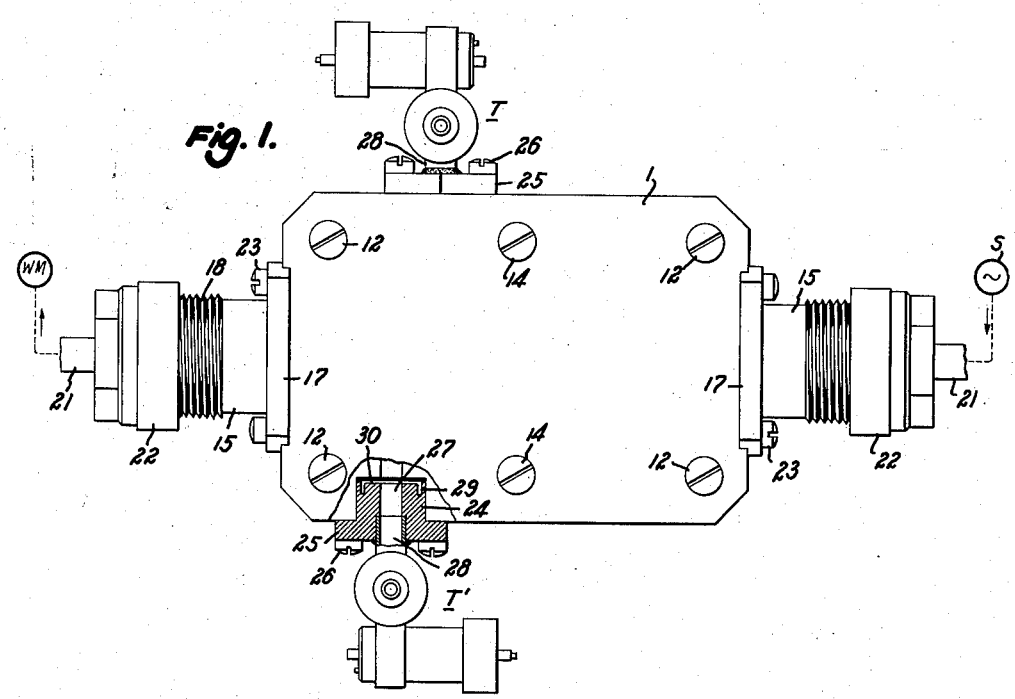
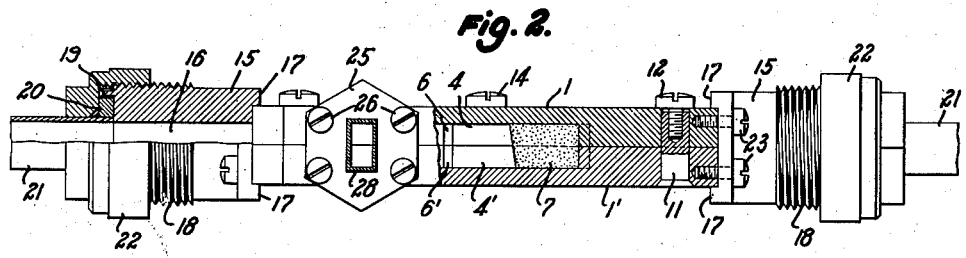
Inventor:
Paul B. King, Jr.,
By Pierce + Scheffler
Attorneys.

Nov. 13, 1951         P. B. KING, JR                2,574,790
                         WAVE GUIDE
Filed May 24, 1946                          3 Sheets-Sheet 2
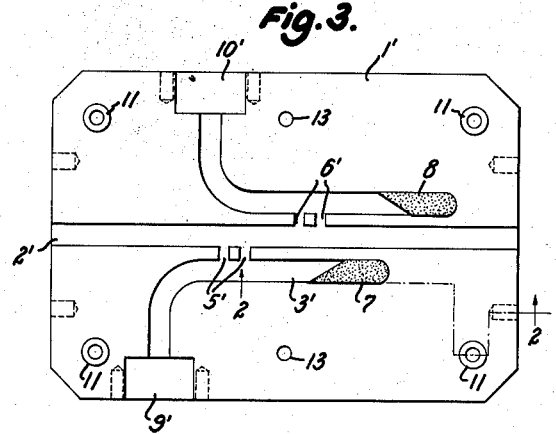
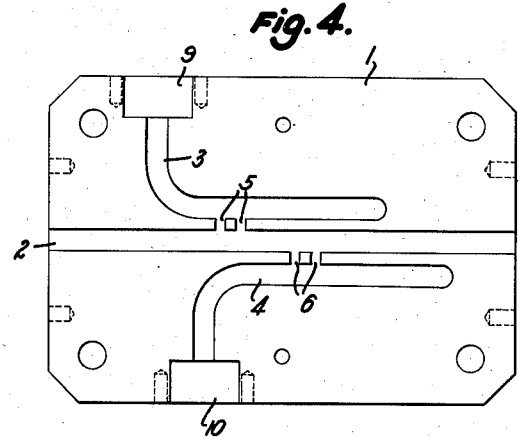
Inventor:
Paul B. King, Jr.,
By Pierce + Scheffler,
Attorneys.

Nov. 13, 1951     P. B. KING, JR     2,574,790
WAVE GUIDE

Filed May 24, 1946     3 Sheets-Sheet 3

Inventor:
Paul B. King, Jr.,

By
Pierce & Schaffler,
Attorneys.

Patented Nov. 13, 1951

2,574,790

UNITED STATES PATENT OFFICE 2,574,790

WAVE GUIDE

Paul B. King, Jr., Mountain Lakes, N. J., assignor to Aircraft Radio Corporation, Boonton, N. J., a corporation of New Jersey Application May 24, 1946, Serial No. 671,949

7 Claims. (Cl. 178—44)

This invention relates to wave guides and more particularly to the mechanical construction of wave guides and/or coupling elements of more or less intricate guide patterns.

The prior method of coupling sections of hollow wave guides has been to employ brass junction blocks, with appropriately shaped internal passages, which were soldered to the wave guide tubing and/or to each other to form a rigid assembly which could not be adequately inspected or cleaned. The solder frequently flowed into the wave guide tubing or the passages within the junction blocks, and thereby altered the intended transmission characteristics. Furthermore, the geometry of the passages within the junction blocks was necessarily limited to simple designs, and the assemblies for complex wave guide patterns were therefore bulky and expensive.

Objects of the present invention are to provide wave guides, including couplings or junctions, which are of relatively simple and economical construction, and which may be readily opened, if desired, for inspection and cleaning. An object is to provide wave guides of novel mechanical construction by which intricate guide patterns may be accurately and economically manufactured. An object is to provide wave guides, including coupling members for a plurality of wave guide branches, of sectional construction which are rigid and leak proof when the sections are assembled. An object is to provide wave guide assemblies of more or less complex nature in the form of a pair of plates in face contact and each having grooves which mate to form a wave guide of one or more branches, the assemblies being such that auxiliary devices such as wavemeters and rectifiers may be readily incorporated in or removed from the assembly for inspection or replacement. Other objects are to provide compact wave guide assemblies of one or more branches, and novel couplings for connecting tubular wave guides to the assemblies.

These and other objects and advantages of the invention will be apparent from the following specification when taken with the accompanying drawings in which:

Fig. 1 is a plan view, with parts in section, of a wave guide assembly embodying the invention, the particular assembly being designed for the testing of thermistors;

Fig. 2 is a side or edge view of the same with parts in section as taken on the line 2—2 of Fig. 3;

Figs. 3 and 4 are plan views of the inner faces of the complementary plates of the wave guide system;

Figure 5:
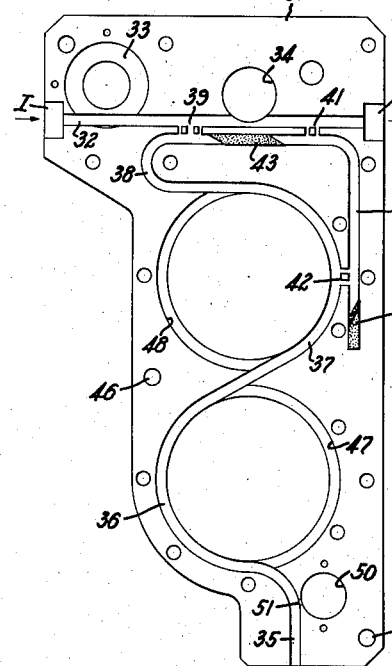
Figs. 5 and 6 are plan views of the inner faces of a more complex wave guide assembly.

In the drawings, the reference numerals 1, 1' identify a pair of plates with complementary grooves at their inner faces which aline, upon assembly of the plates as shown in Figs. 1 and 2, to form a wave guide or branched wave guide system. The illustrated apparatus provides appropriate couplings between a power source S, a wavemeter WM, a standard thermistor T, and a thermistor T' which is to be tested.

The wave guide pattern includes grooves 2, 2' extending longitudinally of the plates 1, 1' respectively, and branch grooves 3, 3' and 4, 4' coupled to the grooves 2, 2' by sets of spaced slots 5, 5' and 6, 6' respectively. The complementary grooves are preferably of the same cross-section and dimensions to avoid the development of a potential difference between the plates. As illustrated, the grooves are of square cross-section and, when the mating plates are assembled, aline to form wave guides of rectangular cross-section. Terminal blocks 7, 8 of insulating material or of a "lossy" dielectric are secured in the inner ends of the branch grooves 3', 4' of plate 1' and are of sufficient height to extend into and fill the corresponding inner ends of the grooves 3, 4 of plate 1. The outer ends of the grooves 3, 4 and 3', 4' are turned outward and terminate in semi-circular recesses 9, 10 and 9', 10' respectively at the edges of the plates 1, 1', these sets of recesses mating to form cylindrical sockets for receiving couplings to the thermistors.

The complementary plates 1, 1' are rigid and may be of metal, for example aluminum which is easily machined or milled to form the wave guide grooves, or they may be milled or molded plates of a plastic in which conducting material is incorporated or upon which conducting films of metal may be deposited by electrolytic processes or metal spraying to form wave guides. It is of course essential that the complementary grooves aline accurately when the plates 1, 1' are assembled, and this condition is readily satisfied by securing cylindrical studs 11 in one plate, for example plate 1' as illustrated, to fit snugly in cooperating openings of the other plate. The outer ends of the studs 11 are bored and threaded to receive clamp screws 12. The plate 1' may have threaded openings 13 formed therein to receive additional clamp screws 14 which extend through the plate 1.

The couplings to the novel split plate form of wave guide assembly may be made in any desired manner but, preferably, the couplings are of one or the other of the illustrated types. The wave guide grooves may terminate at the edge of the complementary plates, see grooves 2, 2', or they may terminate in the recesses 9, 9' and 10, 10' which form cylindrical sockets at the edge of the assembled plates.

When the wave guide grooves extend to the edge of the complementary plates, the preferred coupling comprises a bushing 15 having a wave guide passage 16 therethrough, the inner end of the bushing having opposed flanges 17 which are recessed to fit snugly over the outer surfaces of the plates 1, 1' of the wave guide assembly. The outer end 18 of the bushing is threaded and has one or more lugs 19 extending therefrom to seat in alinement notches in the disk 20 which is soldered or otherwise fixed to the end of a tubular wave guide 21. A gland nut 22 with an internally threaded flange is screwed upon the threaded end 18 of the bushing 15 to secure the wave guide 21 in alinement with the wave guide passage 16 of the bushing 15 and with the complementary wave guide grooves 2, 2' of the plates 1, 1'. The bushings 15 are secured to the assembled plates 1, 1' by screws 23 which extend through the flanges 17 and are threaded into the plates 1, 1'.

The other type of coupling to the wave guide assembly comprises a cylindrical plug 24 which fits snugly into the cylindrical socket in the plates and has a flanged head 25 through which screws 26 extend to anchor the plug in its socket. The plug 24 has a bore 27 of rectangular cross-section which alines with the wave guide passage of the assembled plates, the bore being enlarged at its outer end to receive a wave guide tube 28 which, in the illustrated embodiment, is a part of a thermistor unit. The length of the cylindrical plug 24 is somewhat shorter than the depth of the socket into which it is fitted, thus avoiding precision machining of the parts to obtain a tight closure of the wave guide passages, and the end of the plug is provided with an annular recess 29 which constitutes a choke. The end surface 30 within the recess 29 is preferably cut back, as shown, from the end surface of the outer edge of the coupling plug.

The described split plate construction is particularly advantageous in the case of complex wave guide patterns or networks of several branches in which attenuators or other devices, such as wavemeters or rectifiers, are located. Exceedingly compact and economical constructions are possible as a single set of complementary plates may be provided with several recesses or openings in which a plurality of control or measuring devices may be located. The novel wave guide systems thus differ from the prior constructions in which a separate block was required for each switch, attenuator or other device, the several blocks being connected by wave guide tubing.

The recessed plates for a wave guide assembly of a relatively complex nature are illustrated in Figs. 5 to 9 inclusive; the wavemeter, the attenuators and the crystal rectifier being omitted from these views as the particular design of these elements forms no part of the present invention.

The complete assembly constituted a microwave test set to which either a microwave transmitter or receiver can be connected for testing or calibration. In this assembly, as will be explained below, a single thermistor serves to measure the power delivered to the coupling system by a microwave generator or, alternatively, the power output of the microwave transmitter.

Figure 6:
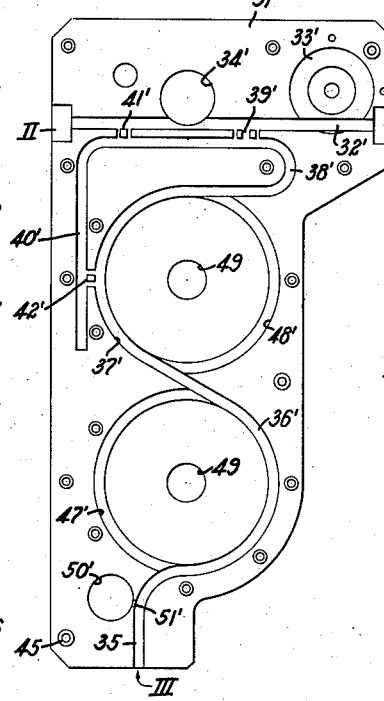

The inner faces of the plates 31, 31' of the wave guide system are shown in elevation in Figs. 5 and 6, and these faces are recessed by machining or molding operations to form the complementary sections of a wave guide system of a "three terminal" type. Complementary grooves 32, 32' extend transversely of the plates 31, 31' between semi-cylindrical recesses which cooperate to form socket terminals I and II. Plug terminals such as illustrated in Fig. 1 are employed to connect a microwave generator to the terminal I and to connect a thermistor to terminal II. The plates have mating cylindrical recesses 33, 33' adjacent the terminal I which open into the grooves 32, 32', and in which is to be mounted a rotary attenuator, not shown, of the type described and claimed in my copending application Ser. No. 671,950 filed May 24, 1946. As illustrated and described therein, an attenuator strip of non-circular outline is supported for angular adjustment into and out of the waveguide passage 32, 32'. Alined cylindrical bores 34, 34' extend completely through the plates 31, 31' and cut into the grooves 32, 32' to receive a wavemeter in a special mounting which will be described hereinafter.

Either a microwave transmitter or a microwave receiver may be connected to the terminal III, and the wave guide path between the terminal III and the passage 32, 32' includes alternatively operative branches or paths, the selection of the alternative paths depending upon the adjustment of the attenuators, not shown, in accordance with the type of apparatus which is to be tested. The path which is operative in the case of a transmitter test includes, as viewed from terminal III, a terminal section formed by complementary grooves 35, 35' which extend inwardly from and normal to the end faces of the plates 31, 31', these linear grooves merging into reversely arranged semi-circular grooves 36, 36' and 37, 37', and semi-circular grooves 38, 38' which open into the passages 32, 32' by sets of coupling slots 39, 39'. The coupling slots 39, 39' open into the grooves 32, 32' between the source terminal I and the wavemeter bores 34, 34', and the frequency of the energy input from the terminal III to the thermistor terminal II may therefore be measured by the wavemeter. When a receiver is connected to the terminal III for testing or calibration, a tunable microwave generator is connected to the terminal I and the frequency and amplitude of the microwave energy introduced in the complementary grooves 32, 32' are measured by the wavemeter mounted in the cylindrical bores 34, 34' and by the thermistor which is connected to terminal II, respectively. The power level may be adjusted to a desired value by means of an attenuator in the cylindrical recesses 33, 33', and the frequency adjustment of the microwave generator may be checked by the wavemeter in the cylindrical bores 34, 34'. The rotary attenuator or switch associated with the complementary grooves 37, 37' is so adjusted that the effective path from wave passage 32, 32' to the receiver at terminal III is through the complementary grooves 40, 40' which open into the wave passage 32, 32' by sets of coupling slots 41, 41', and open into an intermediate portion of the arcuate grooves 37, 37' by sets of coupling slots 42, 42'. The coupling 41, 41' is located between the wavemeter bores 34, 34' and the thermistor terminal II to permit measurement of the frequency of the microwave input to the transmitter at terminal III. The adjacent ends of the grooves 38, 38' and 40, 40' are preferably alined and initially cut or molded as a continuous groove, and a terminal block 43 of insulating material is fitted into the plate 31 to isolate the receiver path grooves 38, 38' from the transmitter path grooves 40, 40'. The grooves 40, 40' extend beyond the coupling slots 42, 42' and a terminal block 44 of insulating material is fitted into the extension of groove 40 of plate 31.

One of the plates, for example plate 31', carries a series of internally threaded studs 45 which extend into openings 46 of the other plate for the accurate positioning of the plates 31, 31' to aline the complementary wave guide grooves of the plates. The alinement studs 45 are internally threaded to receive clamp screws, not shown.

The plates 31, 31' have cylindrical recesses 47, 47' and 48, 48' concentric with the arcuate wave guide grooves 36, 36' and 37, 37' respectively for the reception of rotary attenuators, not shown, of the type described and claimed in the copending application. One of the plates has bores 49, 49 therethrough for the adjusting shafts of the attenuators.

Cylindrical bores 50, 50' extend transversely through the plates 31, 31' adjacent the wave guide grooves 35, 35' for the mounting of a crystal rectifier, not shown, the axes of the bores being alined and normal to the axis of the wave guide passage 35, 35', and the bores being connected to the grooves 35, 35' by ports 51, 51' respectively.

Figure 10:
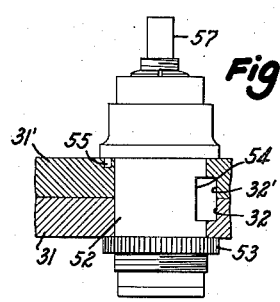
Figs. 10 and 11 are transverse sections through the assembled plate at the wavemeter mounting and on planes at right angles to each other, the wavemeter being shown in elevation.
Figure 11:
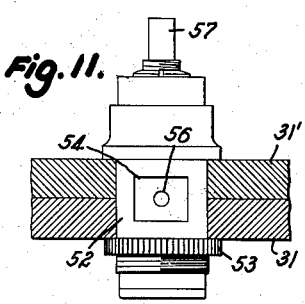

As shown in Figs. 10 and 11, the wavemeter casing includes a cylindrical portion 52 which is inserted into the bores 34, 34' from the outer side of one of the complementary plates, and is secured in place by a gland nut 53 which is threaded upon the casing to seat against the other plate. The cylindrical casing portion 52 is milled to provide a flat surface 54 which is flush with the adjacent surfaces of the grooves 32, 32', see Fig. 10, when the wavemeter is mounted on the plates. Accurate positioning of the wavemeter is insured by a locating pin 55 which is carried by the wavemeter casing and fits into a cooperating socket drilled in the plate 31'. The interior of the casing communicates with wave passage 32, 32' through a central port 56. The adjustable shaft 57 of the wavemeter is threaded into the casing in the usual manner, but the interior construction of the wavemeter is not illustrated as it may be of any conventional or desired design.

Figures 7, 8:
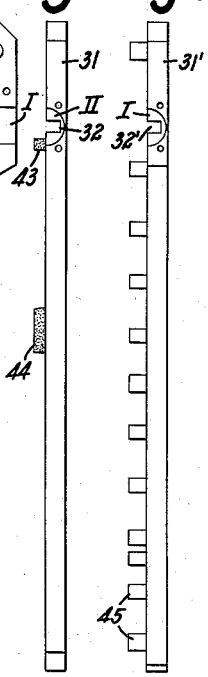
Figs. 7 and 8 are side elevations of the plates as seen from the right side of Figs. 5 and 6 respectively.
Figure 9:
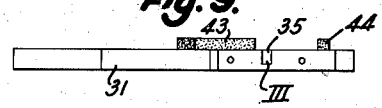
Fig. 9 is an end elevation of the plate of Fig. 5.

The compact wave guide assembly shown in Figs. 5 to 7 is the functional equivalent of the complex and bulky assemblies of wave guide tubes and junction boxes which have been employed previously for checking the operation of microwave transmitters and receivers. The method of operation of the illustrated test set will not be described herein as the operational steps form no part of the present invention.

It is to be understood that the invention is not limited to the particular embodiments herein shown and described as the particular geometry of the wave guide path may be varied to meet design requirements. It is broadly new, so far as I am aware, to form a wave guide assembly from complementary plates which are grooved at their mating surfaces to form a wave guide of a desired configuration.

I claim:

1. A wave guide assembly of the type in which wave guide elements provide a passage of rectangular cross-section and defined by conductive walls, said wave guide assembly comprising a pair of rigid plates, means securing the plates to each other in face contact, the mating faces of the plates having complementary grooves of identical cross-section which extend to the edges of said plates and aline to form a wave guide passage, a coupling bushing having a wave passage therethrough of the geometry of and for alinement with the mating grooves of said plates, and means for securing the bushing to said plates.

2. A wave guide assembly as recited in claim 1, wherein said last-named securing means comprises a flange at the inner end of the bushing and seating against the edges of said plates, and means extending through said flange to secure the bushing to said plates with the wave passage thereof alined with the mating grooves of said plates.

3. A wave guide assembly of the type in which wave guide elements provide a passage of rectangular cross-section and defined by conductive walls, said wave guide assembly comprising a pair of rigid plates, means securing the plates to each other in face contact, the mating faces of the plates having complementary grooves of identical cross-section which extend to the edges of said plates and aline to form a wave guide passage, said grooves terminating at one edge of the plates in mating socket recesses, a coupling plug having a flange seating against the edges of the plates, and means securing the same in said mating socket recesses; said plug having a wave passage therethrough, the inner end surface of the plug being spaced from the adjacent end surface of the socket recesses, and one of said adjacent surfaces being grooved to form a microwave choke.

4. A wave guide assembly as recited in claim 3, wherein said microwave choke groove is in the end surface of said plug.

5. A wave guide assembly of the type in which a passage of rectangular cross-section is defined by conductive walls, said assembly comprising a pair of plates, means for securing the plates to each other in face contact, the mating faces of said plates having a plurality of sets of complementary grooves which extend to the edges of said plates and aline to form wave guide passages, and coupling slots extending between the sets of grooves of the respective plates.

6. A wave guide assembly as recited in claim 5, wherein one of said sets of complementary grooves has terminal portions at opposite ends thereof, said plates have alined bores opening into said set of complementary grooves between the terminal portions thereof for receiving a wavemeter, other sets of complementary grooves each have end portions adjacent said first set of grooves and at opposite sides of said wavemeter bores, and said coupling slots include sets coupling each of said end portions to said first set of complementary grooves.

7. A wave guide assembly comprising a pair of plates, means securing said plates to each other in face contact, the mating faces of said plates having complementary sets of grooves which aline to form a wave guide passage, alined bores extending transversely through said plates adjacent said grooves for the mounting of a device responsive to microwaves, the alined axes of the bores being normal to the axis of the wave guide passage, and passages in each plate connecting the bore and the groove thereof.

PAUL B. KING, JR.

REFERENCES CITED

The following references are of record in the file of this patent:

UNITED STATES PATENTS

| Number | Name | Date |
|---|---|---|
| 1,171,275 | Sullivan | Feb. 8, 1916 |
| 2,155,508 | Schelkunoff | Apr. 25, 1939 |
| 2,381,367 | Quayle | Aug. 7, 1945 |
| 2,419,613 | Webber | Apr. 29, 1947 |
| 2,421,912 | Spooner | June 10, 1947 |
| 2,418,809 | Albersheim | Apr. 15, 1947 |
| 2,423,390 | Korman | July 1, 1947 |
| 2,437,889 | Nordsieck | Mar. 16, 1948 |
| 2,439,527 | Paulson | Apr. 13, 1948 |

FOREIGN PATENTS

| Number | Country | Date |
|---|---|---|
| 493,695 | Great Britain | Oct. 13, 1938 |
| 503,467 | Great Britain | Apr. 6, 1939 |

OTHER REFERENCES

"Die Casting Practice" by Stern, First Edition, Copyright 1930 by McGraw-Hill Book Co., Inc.